(12) United States Patent
Marchi et al.

(10) Patent No.: US 11,291,329 B2
(45) Date of Patent: Apr. 5, 2022

(54) DEVICE FOR PREPARING A BEVERAGE

(75) Inventors: Marco Marchi, Marzabotto (IT);
Cesare Lenzi, Granaglione (IT)

(73) Assignee: KONINKLIJKE PHILIPS N.V.,
Eindhoven (NL)

( * ) Notice: Subject to any disclaimer, the term of this patent is extended or adjusted under 35 U.S.C. 154(b) by 0 days.

(21) Appl. No.: 14/131,026

(22) PCT Filed: Jun. 28, 2012

(86) PCT No.: PCT/IB2012/053277
§ 371 (c)(1),
(2), (4) Date: Jan. 6, 2014

(87) PCT Pub. No.: WO2013/008119
PCT Pub. Date: Jan. 17, 2013

(65) Prior Publication Data
US 2014/0137749 A1   May 22, 2014

Related U.S. Application Data

(60) Provisional application No. 61/506,211, filed on Jul. 11, 2011.

(30) Foreign Application Priority Data

Jul. 8, 2011 (EP) .................................... 11173178

(51) Int. Cl.
*A47J 31/46* (2006.01)
*A47J 31/44* (2006.01)

(52) U.S. Cl.
CPC ........... *A47J 31/46* (2013.01); *A47J 31/4496* (2013.01); *A47J 31/467* (2013.01)

(58) Field of Classification Search
CPC ...... A47J 31/46; A47J 31/4496; A47J 31/467; A47J 31/24; A47J 31/0657
(Continued)

(56) References Cited

U.S. PATENT DOCUMENTS 5,242,702 A * 9/1993 Fond .............................. 426/433
8,220,382 B2 * 7/2012 Verbeek ................ A47J 31/405
426/115

(Continued)

FOREIGN PATENT DOCUMENTS

DE         7700199 U1    9/1977
DE    102009001200 A1 *  9/2010  .............. A47J 31/46
(Continued)

OTHER PUBLICATIONS

DE 102009001200A1, Karmer et al. Sep. 9, 2010.*
(Continued)

*Primary Examiner* — Tu B Hoang
*Assistant Examiner* — Alba T Rosario-Aponte
(74) *Attorney, Agent, or Firm* — Schott, P.C.

(57) ABSTRACT

A beverage making device for preparing a beverage suitable for human consumption with a fine-bubble top cream layer. The beverage making device includes a beverage unit for supplying the beverage, at least one nozzle in fluid communication with the beverage unit, a dispensing spout provided with a cavity with a bottom wall and side walls, a beverage collecting area in a bottom of the cavity, and a bubble-squeezing member provided between the beverage collecting area and a beverage dispensing aperture. The beverage flows from the beverage collecting area through the bubble squeezing member and towards the beverage dispensing aperture.

15 Claims, 8 Drawing Sheets

(58) Field of Classification Search
USPC .................. 99/300, 301, 302 R, 302 P, 323
See application file for complete search history.

(56) References Cited

U.S. PATENT DOCUMENTS

| | | | |
|---|---|---|---|
| 8,322,271 B2* | 12/2012 | Glucksman | B65D 85/8043 |
| | | | 99/282 |
| 2003/0188801 A1 | 10/2003 | Garman | |
| 2004/0094472 A1 | 5/2004 | Brouwer | |
| 2005/0166763 A1* | 8/2005 | Scarchilli | B65D 85/8046 |
| | | | 99/279 |
| 2006/0219098 A1 | 10/2006 | Mandralis | |
| 2006/0283332 A1 | 12/2006 | Garman | |
| 2007/0289453 A1* | 12/2007 | Halliday et al. | 99/295 |
| 2009/0178571 A1 | 7/2009 | Brouwer | |
| 2010/0034929 A1* | 2/2010 | Dogan et al. | 426/89 |
| 2011/0005399 A1* | 1/2011 | Epars et al. | 99/295 |

FOREIGN PATENT DOCUMENTS

| | | | | |
|---|---|---|---|---|
| DE | 102009001200 A1 * | 9/2010 | ............ | A47J 31/467 |
| EP | 0727164 A1 | 8/1996 | | |
| EP | 2105072 A1 | 9/2009 | | |
| FR | 2338027 | * | 8/1977 | |
| JP | 2006-192034 A | 7/2006 | | |
| JP | 2007-502643 A | 2/2007 | | |

OTHER PUBLICATIONS

DE 102009001200A1, Karmer et al. Sep. 9, 2010, Derwent, English Translation Abstract.*
PCT/IB2012/053277 Written Opinion of the International Search Report, dated Feb. 10, 2012.*
Machine translation of DE 102009001200 performed Feb. 11, 2019.*
Machine translation of FR 2338027 performed Jun. 24, 2019.*

* cited by examiner

DEVICE FOR PREPARING A BEVERAGE

CROSS-REFERENCE TO PRIOR APPLICATIONS

This application is the U.S. National Phase application under 35 U.S.C. § 371 of International Application No. PCT/IB2012/053277, filed on Jun. 28, 2012, which claims the benefit of U.S. Provisional Patent Application No. 61/506,211, filed Jul. 11, 2011 and European Patent Application No. 11173178.2, filed on Jul. 8, 2011. These applications are hereby incorporated by reference herein.

TECHNICAL FIELD

The invention relates to a device and to a method for preparing a beverage, such as in particular a beverage suitable for human consumption, with a fine-bubble cream layer, such as espresso coffee or any other coffee or beverage, which has a layer of cream (so-called "crema") on top of the liquid.

BACKGROUND ART

Some hot beverages, such as espresso coffee, hot chocolate, instant coffee and the like are usually prepared with a top layer of fine-bubble froth or cream, also called "crema". Usually, especially in the case of brewed espresso coffee, cream is obtained by using suitably pressurized water fed in an extraction or brewing chamber where the pressurized hot water flows through the ingredients from which substances are extracted to prepare the beverage. Typically, hot water is fed through the brewing chamber by using a pressurized hydraulic circuit. Counter-pressure valves are sometimes used to increase the brewing pressure inside the brewing chamber, in order to increase the amount of cream.

A stable and thick cream layer is a desired feature of a good espresso coffee. The top cream layer should last for several minutes after brewing. The presence of large bubbles in the cream would prejudice the quality and stability of the cream layer, because beyond a certain bubble diameter, the dimension of the bubble tends to increase until the bubble bursts, or large bubbles tend to coalesce forming increasingly larger bubbles which finally burst. This process reduces the thickness of the top cream layer. Moreover, the presence of large bubbles on the beverage surface is undesired for aesthetical reasons, since large unstable bubbles are perceived as indicative of a poor-quality beverage.

Apart from espresso coffee, a stable froth or cream layer is also desirable in other kinds of beverages, e.g. instant coffee-based beverages or other instant beverages produced from soluble ingredients, as well as other coffee-based beverages produced starting from ground coffee.

EP-A-1658001 discloses a device aimed at providing a more stable froth or cream layer on top of an edible beverage, such as espresso coffee. This known device includes a settling chamber for settling the frothed beverage dispensed from a frothing member arranged downstream of a brewing chamber. In some embodiments disclosed therein, the settling chamber includes an inlet for supplying the frothed beverage to the settling chamber and a guiding surface in the settling chamber, arranged under said inlet.

Additionally, good espresso coffee must be served at high temperature. However, the temperature of water flowing through the ingredients, such as coffee powder cannot be increased at will. For example, in the case of espresso coffee, a continuous water flow temperature beyond a threshold of typically around 90-95° C. is undesired, because too high a temperature would damage the coffee powder and result in poor organoleptic characteristics of the final beverage. It is therefore important to limit heat losses from the beverage while flowing from the outlet nozzle of the beverage producing unit to the cup.

SUMMARY OF THE INVENTION

The invention concerns improvements to beverage making devices, aimed at solving or alleviating at least some of the drawbacks of known devices.

According to one aspect of the invention, a beverage making device is provided, for preparing a beverage suitable for human consumption with a fine-bubble cream layer, such as espresso coffee, hot chocolate, instant coffee or the like, comprising: a beverage unit for supplying said beverage; at least one nozzle in fluid communication with the beverage unit; a dispensing spout provided with a cavity with a bottom wall and side walls; a central beverage collecting area in the bottom of said cavity, arranged so that the beverage exiting the nozzle flows in the central beverage collecting area at the bottom of the cavity of the spout. Moreover, the device further comprises at least two beverage dispensing apertures in the bottom wall, at opposite sides of the central beverage collecting area. For each beverage dispensing aperture, a bubble-squeezing member is arranged between the central beverage collecting area and the respective beverage dispensing aperture. The beverage delivered by the nozzle in the central beverage collecting area flows from the central beverage collecting area through the bubble squeezing members towards the beverage dispensing apertures.

The nozzle can be any component, element or structure suitable to convey the beverage so that it collects in the central collecting area.

The two bubble-squeezing members arranged between the central beverage collecting area and the two beverage dispensing apertures define a bubble passageway, where larger bubbles present in the beverage coming from the nozzle are squeezed and eventually burst, so that a smooth, uniform cream is generated.

The removal of large bubbles improves the appearance of the final top cream layer, which characterizes some kinds of beverages, such as espresso coffee. The cream thus gets a more compact visual aspect. Additionally, reduction or removal of large bubbles enhances the stability of the cream layer. Large bubbles in a top cream layer would tend to coalesce and form increasingly larger bubbles which eventually burst, thus reducing the stability of the cream layer. This phenomenon also negatively affects the appearance of the cream layer in the beverage cup. Causing the large bubbles to burst inside the dispensing spout before the beverage is dispensed in the cup solves or at least alleviates these problems.

In some embodiments, the bubble squeezing means includes a beverage flow channel or a restricted passage through which the beverage is caused to flow. The restricted passage or the channel have a width which can be equal to or smaller than a maximum admissible bubble dimension. The flow channels can extend substantially transversely to a direction of alignment of the beverage dispensing apertures, preferably at 90° thereto.

According to one embodiment, an elongated flow guiding member is arranged in the dispensing spout and extends from said bottom wall towards the nozzle. The elongated flow guiding member can advantageously be provided with surface ribs extending along said flow guiding member from a first upper end facing said nozzle towards said bottom wall of the dispensing spout. Said surface ribs define flow channels or grooves which extend along the outer surface of the elongated flow guiding member. The grooves and ribs are preferably oriented according to the flow lines of a laminar flow, i.e. they extend from the point of the elongated flow guiding member, which is first contacted by the flow, towards the base of the latter. If the guiding member is vertically oriented, the grooves and ribs preferably lie in respective vertical planes. The term "vertical" is referred to the position taken by the device when in use. The guiding member can, however, have a different orientation, e.g. it can be inclined with respect to a vertical line. In this case the ribs and grooves are correspondingly oriented in an inclined fashion.

According to a different embodiment, the elongated flow guiding member can be combined with a single beverage dispensing aperture.

A laminar or nearly laminar flow of the beverage along the ribs and grooves of the elongated flow guiding member is induced by the grooves and ribs mainly arranged according to the laminar flow lines. Compared to a turbulent flow, the laminar flow reduces the heat dissipation towards the ambient air and the surface of the elongated flow guiding member. The laminar flow also preserves the fine bubbles contained in the beverage and generated e.g. using high water pressure in the brewing chamber of coffee machine. The larger the quantity of preserved fine bubbles, the thicker the top cream layer obtained in the cup.

The beverage is preferably dispensed by said nozzle at low pressure, preferably at nearly ambient pressure, i.e. the pressure inside the nozzle upstream the nozzle aperture is equal to or only slightly higher than the atmospheric pressure such that the beverage drops on the top of the elongated flow guiding member mainly by gravity without being accelerated at the exit of the nozzle. This reduces turbulence in the flow and renders the operation of the device more efficient in terms of flow-turbulence reduction.

The ribs and the grooves formed there between can extend for only a part of the total length of the elongated flow guiding member. In preferred embodiments, however, the ribs and grooves develop for the entire extension of the elongated flow guiding member.

In some embodiments the dispensing spout is provided with a cavity closed by said bottom wall, said elongated flow guiding member extending from said bottom wall in said cavity.

The two beverage dispensing apertures are preferably symmetrically arranged in the bottom wall of the dispensing spout. In some embodiments they can be positioned at opposite sides of said elongated flow guiding member, if present. In other embodiments the two apertures and the elongated flow guiding member could be arranged at the vertices of a triangle.

According to a particularly advantageous embodiment, each bubble-squeezing member can be comprised of a first projection and a second projection, which extend from the bottom wall of the cavity of the dispensing spout and form a beverage flow channel therebetween, such that the beverage flows from the central breverage collecting area, or from said elongated flow guiding member (if present) through said beverage flow channel and towards the respective beverage dispensing aperture. The projections are advantageously in the form of flat, planar appendages extending from the bottom wall and from mutually opposing side walls, such that narrow channel inlet and outlet passages are formed between each pair of projections arranged parallel to one another.

In order to obtain a mainly laminar beverage flow, according to some embodiments the elongated flow guiding member has a rounded top end opposing the nozzle from which the beverage is dispensed on the elongated flow guiding member. According to preferred embodiments, the elongated flow guiding member further has an elongated body extending from said rounded top end towards the bottom wall of the dispensing spout. In some exemplary embodiments the elongated body is frustum-conical. In other embodiments the elongated body is cylindrical. Other shapes are also possible, such as an elongated solid of revolution. The surface ribs and grooves provided on the surface of the elongated flow guiding member extend preferably from a central area of said rounded top end along the elongated body of the elongated flow guiding member towards the bottom wall.

In some embodiments, each beverage dispensing aperture opens in a downwardly oriented duct having a bottom outlet from which the beverage exits the dispensing spout. The inner surface of the duct can be ribbed, i.e. can be designed with ribs which further contribute to a laminar flow of the beverage.

In some embodiments, the dispensing spout is removable from the beverage making device. This allows the use of larger containers, such as jugs, carafes, glasses or any other kind of container which is higher than usual so-called "espresso cups", if required. Additionally, removal of the dispensing spout also allows throughout cleaning of the inner parts and surfaces of the dispensing spout, especially those which get into contact with the beverage.

According to a further aspect, the invention provides a method for preparing a beverage suitable for human consumption with a fine-bubble cream layer, such as espresso coffee, wherein a beverage flow is supplied to a dispensing spout, and wherein:

the beverage flow is dispensed by a nozzle in a central beverage collecting area at a bottom wall of a cavity within a dispensing spout; and the beverage collected at the bottom wall is passed through two bubble squeezing members arranged between said central beverage collecting area and two dispensing apertures (41), large bubbles being caused to burst when flowing through said bubble squeezing member.

According to some embodiments, the beverage is dispensed by the nozzle on an elongated flow guiding member arranged in the dispensing spout and extending from the bottom wall of said dispensing spout, the elongated flow guiding member being preferably provided with surface ribs extending along the flow guiding member from a first end facing the nozzle towards the bottom wall, so that the beverage is caused to flow with a reduced turbulence or under laminar or nearly laminar flow conditions along the elongated flow guiding member towards the bottom wall. Further advantageous features and embodiments of the device and method according to the invention are described here below and set forth in the dependent claims.

According to a different aspect, a beverage making device for preparing a beverage suitable for human consumption with a fine-bubble cream layer, is provided, comprising: a beverage unit for supplying said beverage; at least one nozzle in fluid communication with the beverage unit for supplying the beverage to the nozzle; a dispensing spout provided with a bottom wall and at least one beverage dispensing aperture in said bottom wall; wherein said dispensing spout is removably connected to said beverage making device.

According to still another aspect, the invention provides a beverage making device for preparing a beverage suitable for human consumption with a fine-bubble cream layer, comprising: a beverage unit for supplying said beverage; at least one nozzle in fluid communication with the beverage unit for supplying the beverage to the nozzle; a dispensing spout provided with a bottom wall and at least one beverage dispensing aperture in said bottom wall; wherein: an elongated flow guiding member is arranged in the dispensing spout and extends from said bottom wall towards said at least one nozzle; and wherein between said at least one beverage dispensing aperture and said elongated flow guiding member, a bubble-squeezing member is arranged, the beverage flowing from said elongated flow liquid member towards said beverage dispensing aperture flowing through said bubble squeezing member. The bubble squeezing member can include a pair of opposing and mutually staggered projections, e.g. in the form of flat laminae or walls projecting from the bottom of the spout, and defining a beverage flow channel there between. The dispensing spout can include two dispensing apertures, at opposite sides of the flow guiding member, and further including two opposing bubble squeezing members, one for each dispensing aperture.

According to a further aspect, a beverage making device for preparing a beverage suitable for human consumption with a fine-bubble cream layer is provided, comprising: a beverage unit for supplying said beverage; at least one nozzle in fluid communication with the beverage unit for supplying the beverage to the nozzle; a dispensing spout provided with a bottom wall and at least one beverage dispensing aperture in said bottom wall; wherein: an elongated flow guiding member is arranged in said dispensing spout and extends from said bottom wall towards said at least one nozzle; and between said at least one beverage dispensing aperture and said elongated flow guiding member a bubble-squeezing member is arranged, the beverage flowing from said elongated flow guiding member through said bubble squeezing member and towards said beverage dispensing aperture.

BRIEF DESCRIPTION OF THE DRAWINGS

A more complete appreciation of the invention and many of the advantages thereof will be readily obtained as the same becomes better understood by reference to the following detailed description when considered in connection with the accompanying drawings, which show one exemplary non-limiting embodiment of the invention. In the drawings.

DESCRIPTION OF AN EMBODIMENT OF THE INVENTION

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Here below reference will be specifically made to an application of the invention to a coffee-making machine, such as for example an espresso machine or another kind of coffee-producing machine. It shall, however, be understood, that the invention can be used in different kinds of beverage making devices and apparatus, where similar problems arise and where use of the invention can result in improved characteristics of the produced beverage.

In the embodiment illustrated in the drawings and described here below, the device includes both an elongated flow guiding member provided with ribs and combined with two dispensing apertures in a bottom wall of a cavity of a beverage dispensing spout, wherein two bubble squeezing and collapsing members are arranged between the centrally arranged elongated flow guiding member and the two apertures. It shall however be understood that in other embodiments the elongated flow guiding member can be omitted, and the beverage, e.g. espresso coffee, dripping from a nozzle, can be collected in a central beverage collecting area arranged in an intermediate position between the two apertures and two respective beverage squeezing members can be arranged, between the central collecting area and a respective one of said apertures.

Figure 2:
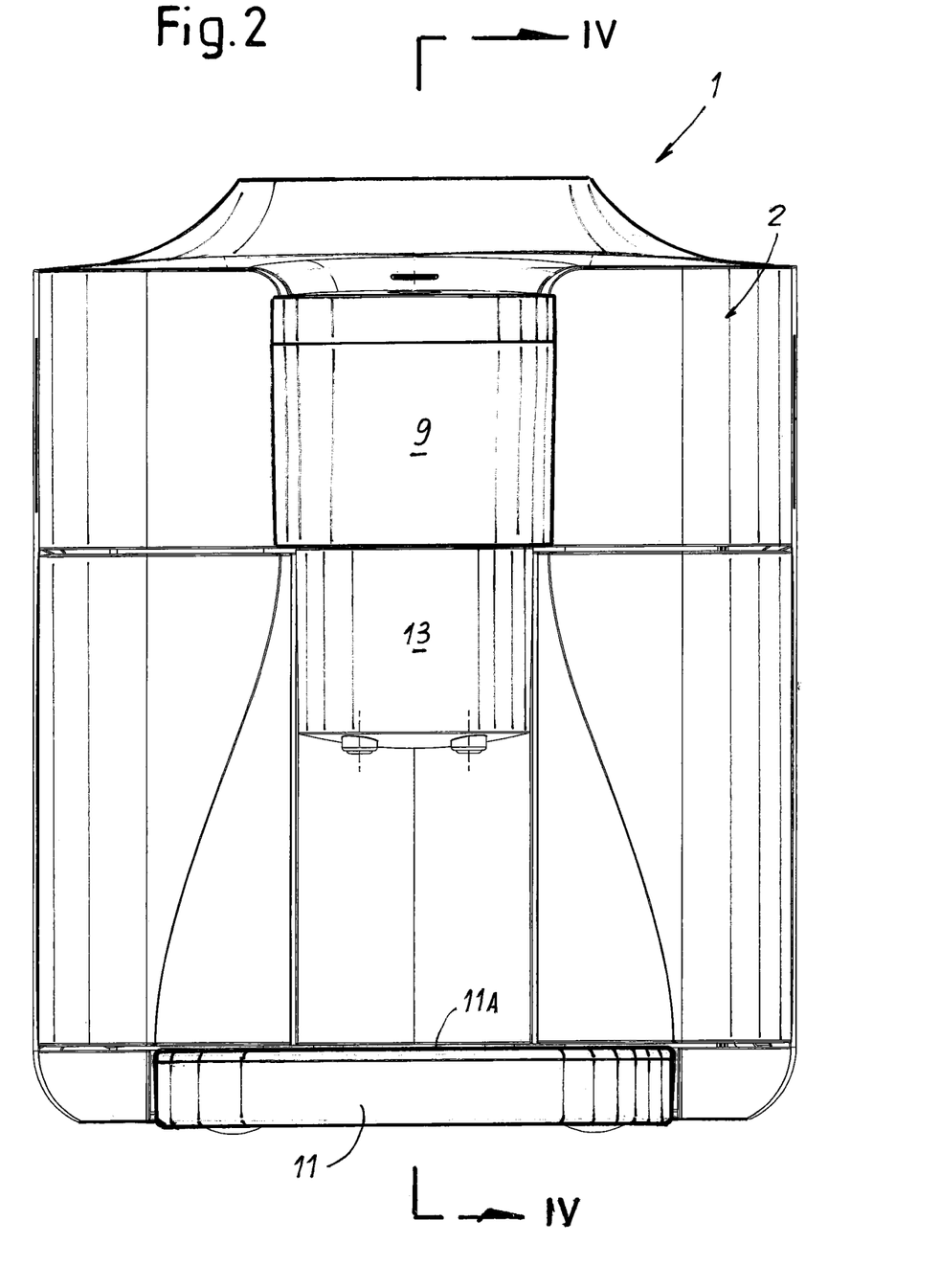
FIG. 2 shows a front view according to line II-II of FIG. 1.
Figure 3:
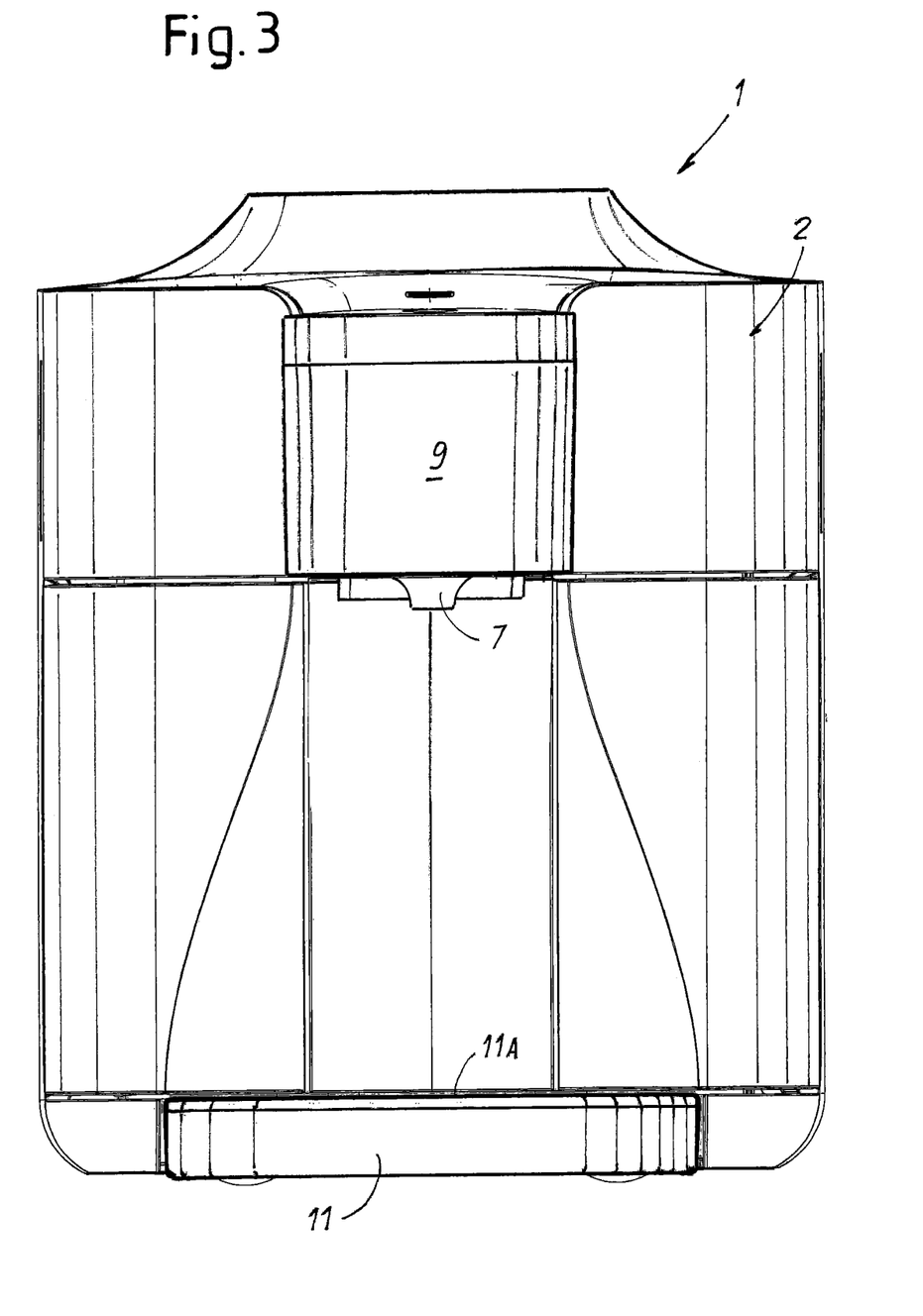
FIG. 3 shows a front view similar to FIG. 2, with the dispensing spout removed from the device.
Figure 4:
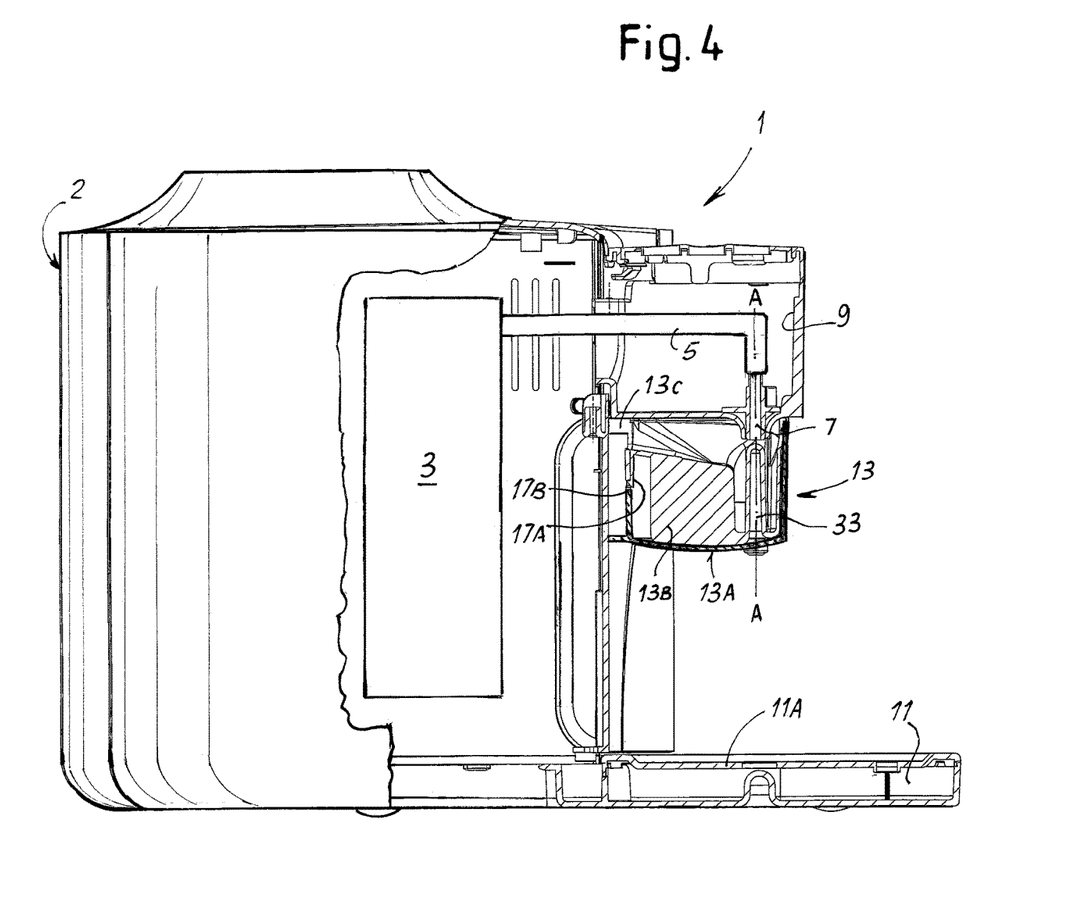
FIG. 4 shows a partial cross-section according to line IV-IV in FIG. 2.

Referring first to FIGS. 1 to 4, reference number 1 designates a coffee machine as a whole. The coffee machine includes a housing 2 wherein a plurality of apparatus, components and instrumentalities are housed, such as for example: an electronic control unit, a coffee grinder or a coffee powder dispensing apparatus or a capsule loader, a water tank, a pump, a heater and a brewing chamber. All those components are well known to those skilled in the art and will not described in greater detail herein. In FIG. 4 a block 3 schematically represents a beverage unit, which includes for example a water pump, a water heater, a brewing chamber and a dosing system for dispensing a metered quantity of coffee or any other ingredient, such as a soluble product, for the production of a beverage. The beverage unit 3 is connected by means of a duct 5, to a coffee nozzle 7.

In the embodiment shown in the accompanying drawings the coffee nozzle 7 is arranged on the bottom of a projection 9 of the housing 2. The projection 9 extends from a front side of the coffee machine 1 and is located above a tray 11 provided with a closing grid 11A forming a support for a cup, a jug, a glass or any other kind of beverage container, which can be placed under the nozzle 7 to collect the beverage produced by the coffee machine 1. The tray collects also any water or beverage dripping from the nozzle 7 when no container is placed there under.

Figure 1:
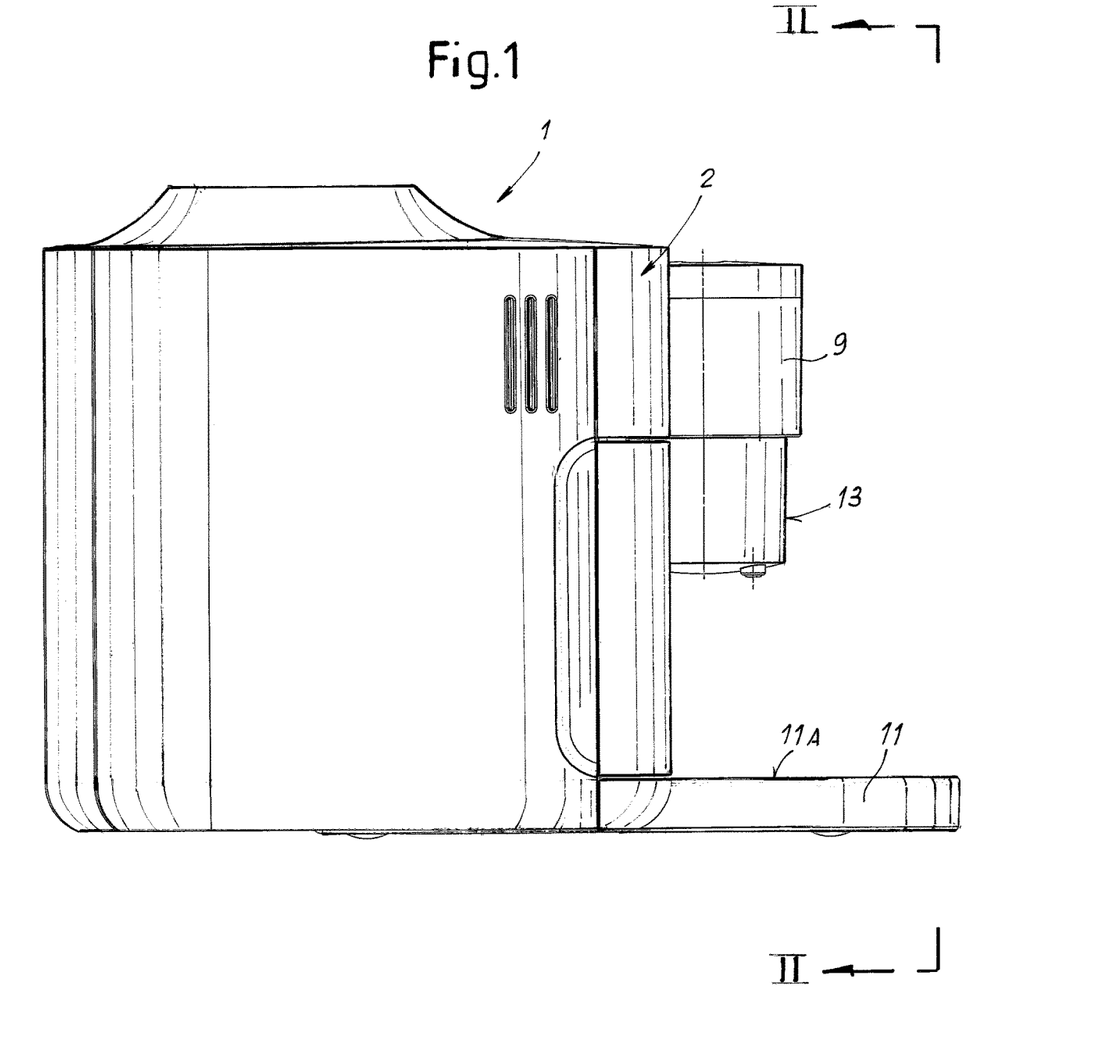
FIG. 1 shows a side view of a coffee machine including a beverage making device according to the invention.

The coffee machine 1 is further provided with a preferably removable dispensing spout 13 which can be removably engaged to the machine housing underneath the nozzle 7. In FIGS. 1, 2 and 4 the dispensing spout 13 is connected to the machine 1, while FIG. 3 shows the machine with the dispensing spout 13 removed there from.

Mainly for manufacturing purposes, in the embodiment shown in the drawings, the dispensing spout 13 is comprised of two portions, namely an outer portion 13A and an inner portion 13B. The outer portion 13A comprises a bottom wall 19 and a side wall 21. The outer portion 13A and the inner portion 13B are mutually connected e.g. by gluing or welding. In preferred embodiments, as shown in the drawings, the two portions are connected by means of a resilient latch 17 (FIG. 4) including a resilient tongue 17A formed on the inner portion 13B and engaging in a slit 17B formed in a side wall 21 of the outer portion 13A. In other embodiments, the dispensing spout 13 could be molded as a solid component, rather than in two or more portions.

The side wall 21 of the outer portion 13A has an upper edge forming an annular seat 21A housing a ring flange 23 provided on top of the inner portion 13B. Two through passages 19A are provided in the bottom wall 19 of the outer portion 13A.

Figure 5:
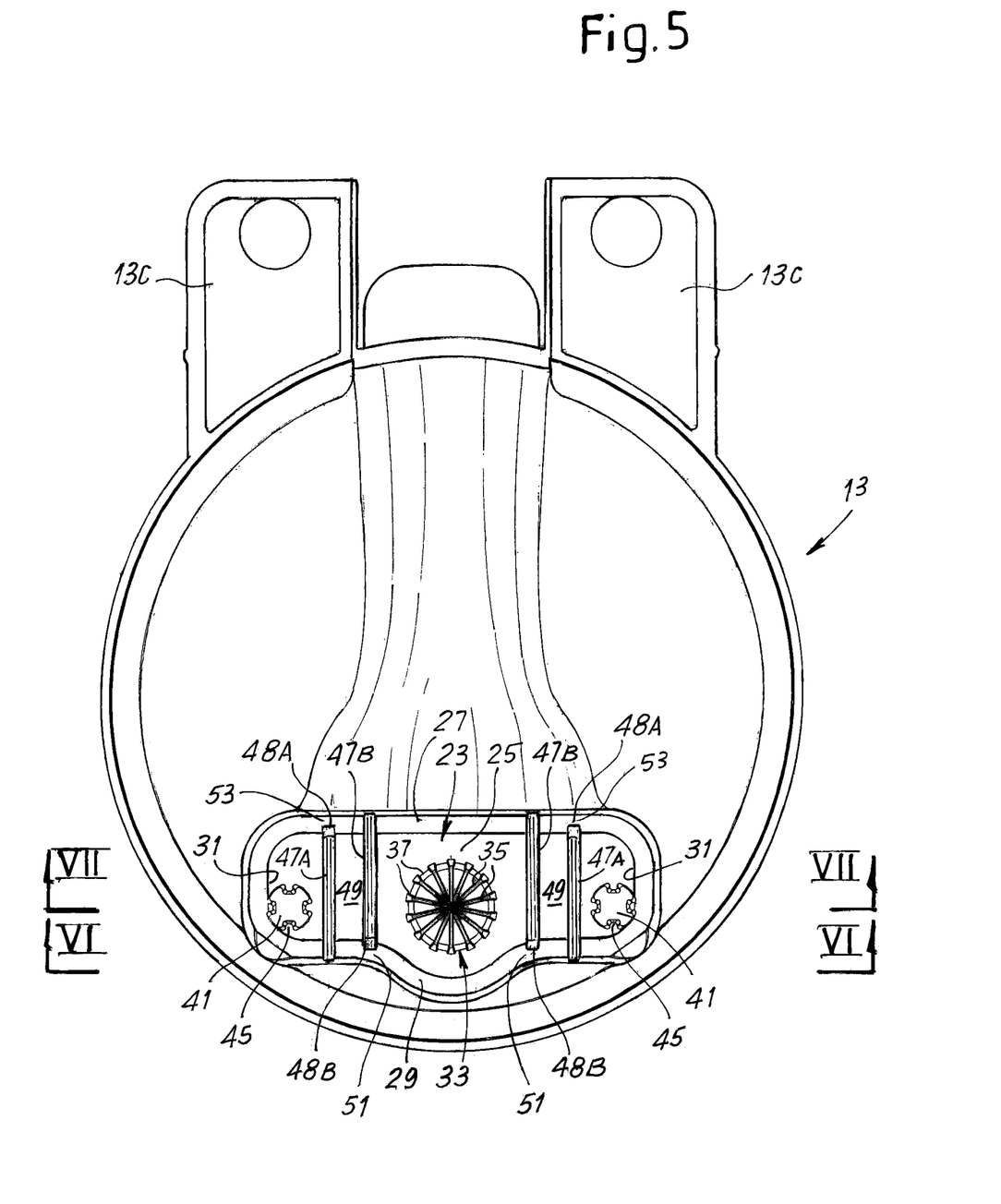
FIG. 5 shows a top plan view of the dispensing spout.
Figure 6:
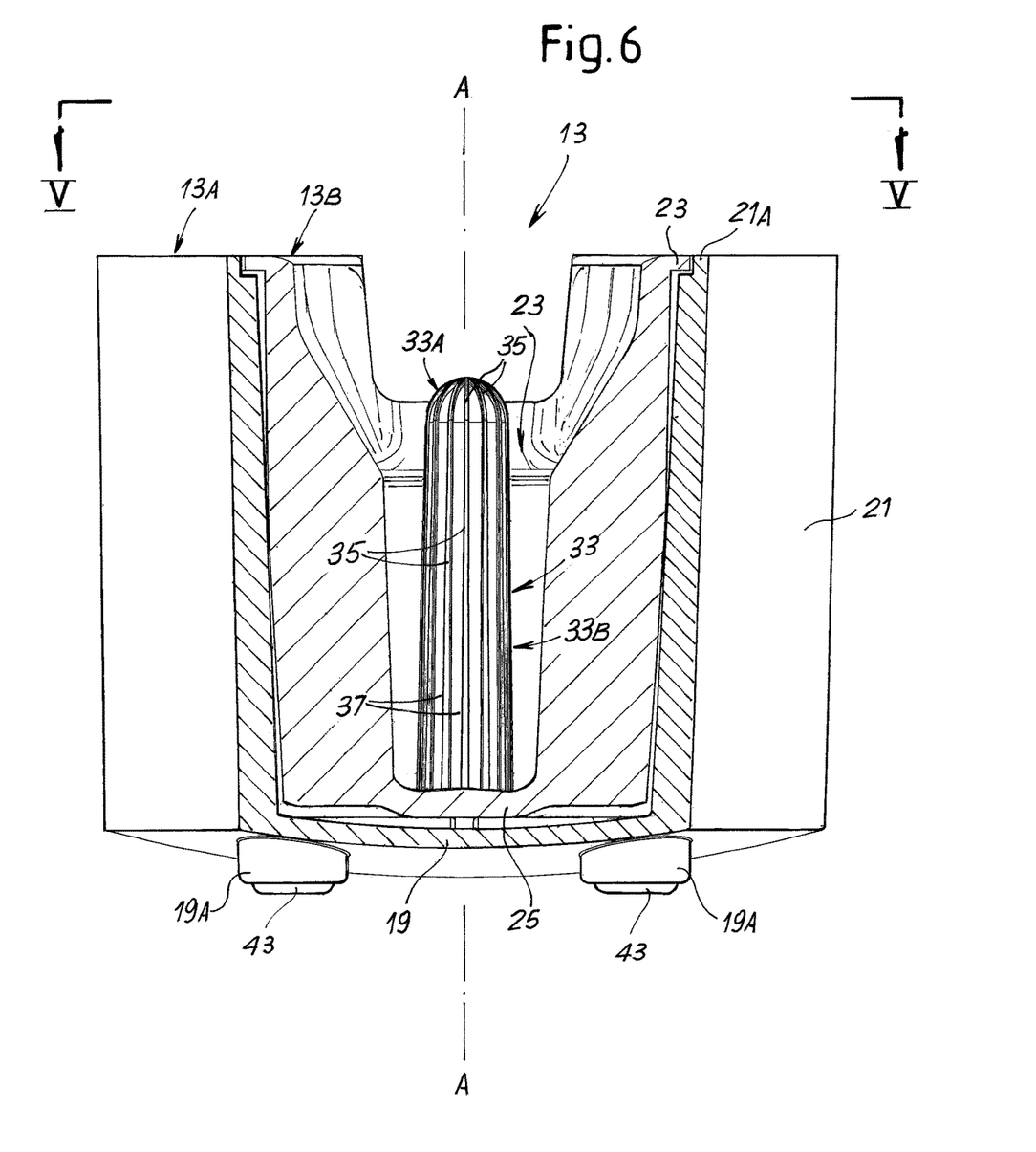
FIGS. 6 and 7 show cross-sections of the dispensing spout according to lines VI-VI and VII-VII of FIG. 5.

Furthermore, the outer portion 13A is provided with two appendages 13C (FIG. 5) removably engageable in corresponding slots (not shown) of the housing 2, in order to engage and disengage the dispensing spout 13 from the machine 1. The dispensing spout 13 can be removed from the machine 1 (FIG. 3) for cleaning purposes and also when a user desires to place a relatively cumbersome container, such as a jug or carafe under the coffee nozzle 7. By removing the dispensing spout 13 more space is made available for the container between the nozzle 7 and the tray 11.

In other embodiments, not shown, the outer portion 13A of the dispensing spout 13 can be dispensed with and the appendages 13C can be directly formed on the inner portion 13B.

The inner portion 13B of the dispensing spout comprises an inner cavity 23 bounded by a bottom wall 25, two opposing larger side walls 27, 29 and two smaller side walls 31. The cavity 23 is open at the top. An elongated flow guiding member 33 is arranged in the cavity 23 and projects from the bottom wall 25 towards the upper aperture of the cavity 23. More specifically, the elongated member extends from a central beverage collecting area on the bottom wall 25 of the cavity 23 towards the nozzle 7. When the dispensing spout 13 is mounted on the coffee machine 1 (FIGS. 1-4), the member 33 extends in a substantially vertical direction from the bottom wall 25 of the inner cavity 23 towards the coffee nozzle 7 and is substantially coaxial to said coffee nozzle 7. The elongated member 33 will be designated here below as an elongated flow guiding member for the reasons which will become apparent from the following description.

The elongated flow guiding member 33 comprises a first portion 33A and a second portion 33B. The first portion 33A forms the distal end of the elongated flow guiding member; the second portion 33B extends from the first portion 33A to the bottom wall 25. The first portion 33A is globally hemispherical, while the second portion 33B has globally the shape of a frustum of a cone. The surfaces of both the first and the second portion 33A, 33B of the flow guiding member 33 are provided with a plurality of ribs 35. The ribs 35 depart from a central area of the hemispherical first portion 33A of the elongated fluid guiding member 33 and extend along meridian lines of said hemispherical portion 33A towards the equatorial line of the latter. From there each rib extends along a corresponding generatrix of the globally frustum-conical second portion 33B. Respective pairs of adjacent ribs 35 form a groove or channel 37 therebetween. Each groove extends from the distal end of the elongated flow guiding member 33 towards the bottom wall 25 of the dispensing spout 13. The grooves 37 have the function of guiding the flow of coffee dispensed from the nozzle 7 such that a substantially or nearly laminar flow is obtained from the top distal end of the elongated flow guiding member 33 towards the base of said elongated flow guiding member 33 adjacent the bottom wall 25. Laminar flow is induced by the grooves 37 and ribs 35 having a pattern corresponding to the pattern of laminar flow lines.

In the embodiment shown, the bottom wall 25 has two beverage dispensing apertures 41 arranged at opposite sides of the elongated fluid guiding member 33. Each beverage dispensing aperture 41 extends in the form of a through hole across a corresponding downwardly oriented projection 43, thus forming a downwardly oriented duct having a bottom outlet. Each projection 43 extends through a corresponding hole 19A of the outer portion 13A of the dispensing spout 13. In some embodiments, the beverage dispensing apertures 41 have a rib-shaped inner surface or an X-shaped cross section at the end of the exit.

Figure 8:
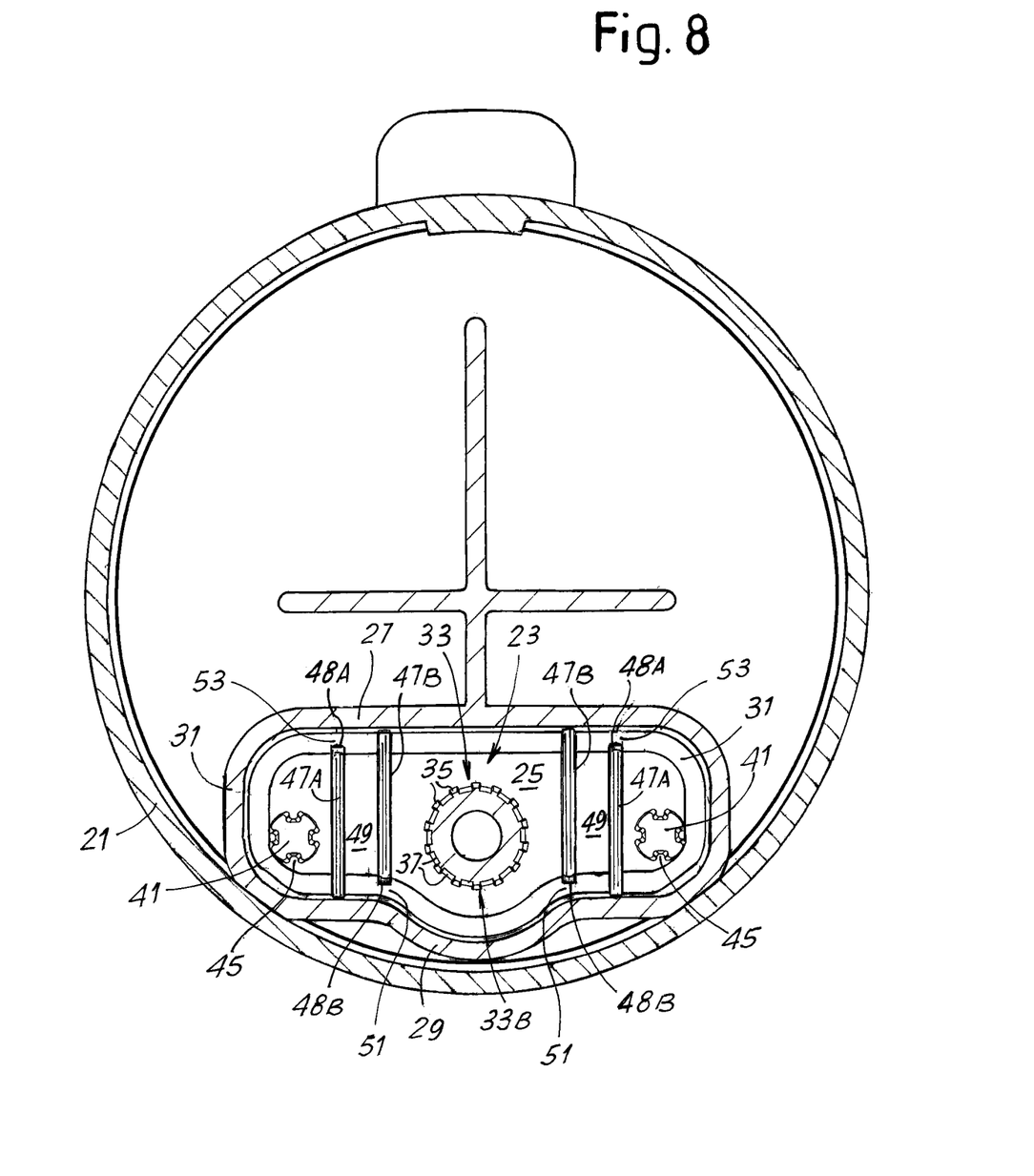
FIG. 8 shows a cross-section of the dispensing spout according to line VIII-VIII in FIG. 7.

Between the elongated flow guiding member 33 and each beverage dispensing aperture 41 a pair of flat projections 47A, 47B are arranged. The foot of each flat projection is connected to the bottom wall 19. A first one 47A of said flat projections 47A, 47B in each pair is further connected to the side wall 27 and ends with a distal edge 48A facing the opposite side wall 31. The second one 47B of said flat projections is connected to the opposing side walls 29 and ends with a distal edge 48B facing the opposite side wall 29, as can be best appreciated in FIGS. 5 and 8. Each pair of flat projections 47A, 47B forms a beverage flow channel 49 between said projections. Each channel 49 has a channel inlet 51 formed between the respective edge 48B of the flat projection 47B and the side wall 29, as well as a channel outlet 53 between the respective edge 48A and the side wall 27. Each channel extends substantially orthogonal to a direction along which the two beverage dispensing apertures 41 are aligned, such that a flow deviation of the beverage takes place upon entry into the respective beverage flow channel 49.

In alternative embodiments, not shown, a single flat projection 47A or 47B can be provided between the elongated guiding member 33 and each dispensing aperture 41.

The flat projection 47A, 47B or the pair of projections 47A, 47B form a hindrance in the form of a narrow flow passage which obstructs the free flow of the beverage from the central beverage collecting area at the bottom of cavity 23 towards the dispensing apertures 41. The beverage therefore collects at the bottom of the cavity 23 before flowing towards and through the dispensing apertures 41. This results in a balanced flow through the two opposing dispensing apertures 41, i.e. a substantially identical beverage flow through both dispensing apertures 41. The narrow passage hindering or slowing down the beverage flow can be formed by the inlet 51 or by the outlet 53 of the channel 49 and/or by the channel 49 itself. If only one projection 47A or 47B is provided, only one narrow passage is formed between the edge 48A or 48B and the opposing side wall 27 or 29. If a pair of projections are provided, a longer restriction, formed by the channel 49, is provided. The effect of the flow restriction is on the one side to balance the flow towards the dispensing apertures 41, and on the other side to reduce the number of larger bubbles present in the bubble layer. Bubbles are caused to burst while passing through the restricted flow section defined by edges 48A, 48B and/or by channel 49.

In some embodiments (not shown) the elongated flow guiding member 33 can be omitted, and the beverage will drip directly from the nozzle 7 on the bottom wall 25 and collect in the central beverage collecting area at the bottom of the cavity 23. From there it will flow in a balanced manner towards the two apertures 41 passing through the narrow passages where the larger bubbles will be destroyed before dispensing the beverage through the apertures 41.

Figure 7:
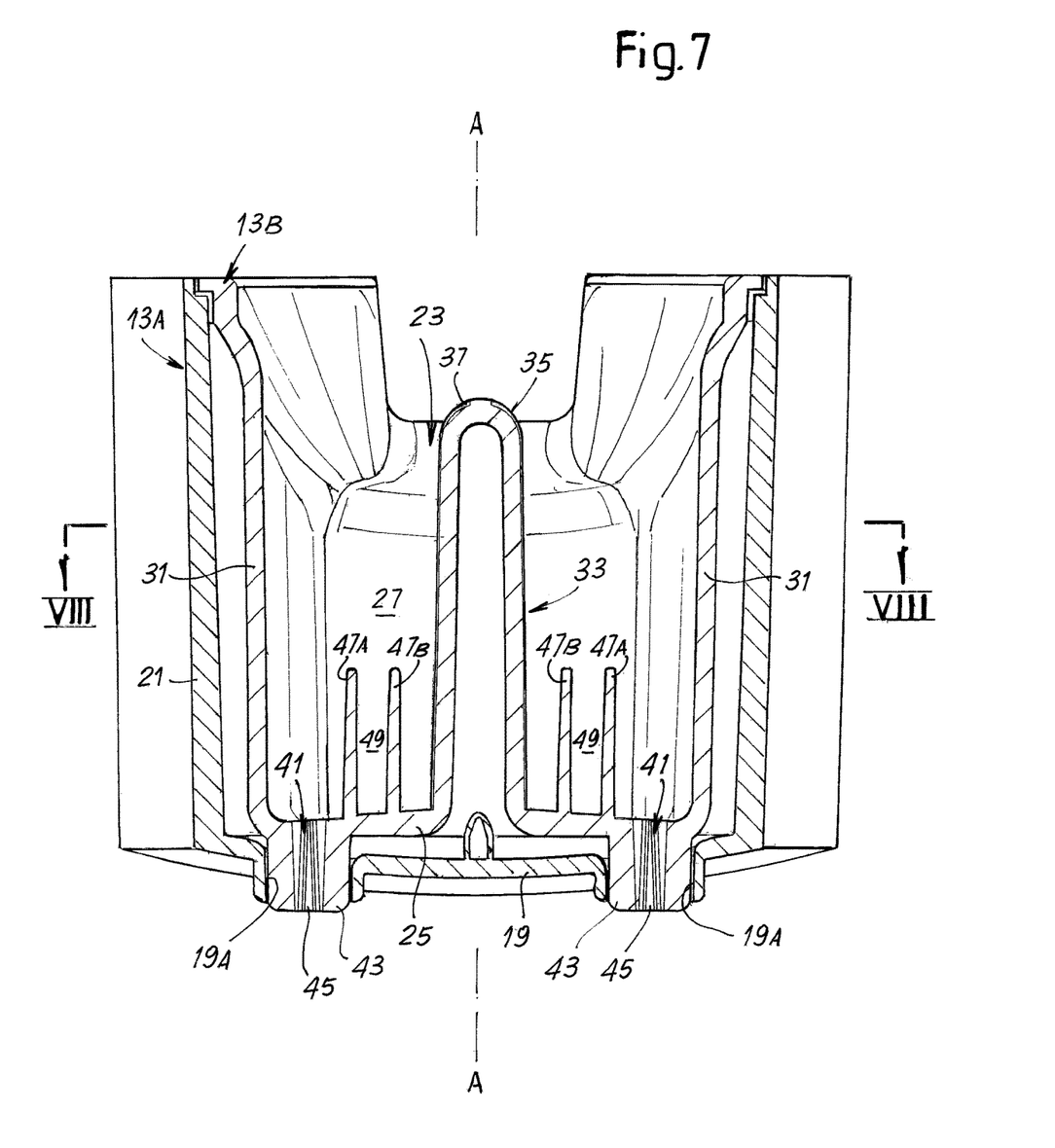

The upper surface of the bottom wall 25 of the inner portion 13B of the dispensing spout 13 is inclined, as best shown in FIG. 7, such that the beverage will then flow by gravity from the central beverage collecting area (surrounding the elongated beverage guiding member, if present) through the channel inlets 51 into the beverage flow channels 49. The beverage exits the beverage flow channels 49 through channel outlets 53 and is finally dispensed through beverage dispensing apertures 41 into a cup placed under the dispensing spout 13.

The narrower dimension (i.e. the width) of the inlets 51 and outlets 53 and/or the distance between the flat projections 47A, 47B of each pair of projections is chosen such that larger bubbles which happen to be present in the beverage flowing along the respective channel 49 will be squeezed when passing through the inlets 51 and along the channels 49, between the inwardly oriented surfaces of said projections and will eventually burst. Thus, the channels 49 act as bubble-squeezing means. If only one projection 47A, 47B is provided for each dispensing aperture 41, this effect will be at least partly achieved by the narrow passage 51 or 53.

The operation of the beverage making device described so far is as follows. Under normal operating conditions the dispensing spout 13 remains connected to the coffee machine 1, as shown in FIGS. 1, 2 and 4. A sufficiently small cup or other container is placed on the grid 11A under the dispensing spout 13. The brewing cycle is activated by the user through a suitable user interface, not shown. The coffee beverage, produced by the beverage unit 3, is fed through duct 5 towards the nozzle 7 and from there it drops on the top end of the elongated flow guiding member 33. Under suitable brewing conditions the liquid flow contains fine bubbles which, once the liquid is collected in the cup, will form a top layer of cream on the coffee.

The surface pattern of said elongated flow guiding member 33 is such that the beverage smoothly flows under substantially laminar or nearly laminar conditions along the grooves 37 and ribs 35, until it is collected in the bottom of the cavity 23. Laminar or nearly laminar flow has two advantageous effects over a turbulent flow. On the one hand the fine bubbles forming the cream are preserved, such that a greater amount of cream is obtained at the exit of the dispensing spout 13. On the other hand a laminar or nearly laminar flow reduces heat transfer from the beverage to the environment. The beverage collected in the cup will have a high temperature without the need to increase the brewing temperature which could prejudice the organoleptic properties of the beverage.

Once collected at the bottom of the elongated flow guiding member 33, the beverage is divided into two substantially symmetrical streams, thanks to the symmetry of the dispensing spout and each stream enters the respective beverage flow channel 49 between opposing projections 47A, 47B. As noted here above, the distance between the opposing projections 47A, 47B is such that larger bubbles possibly present in the liquid flowing along the beverage flow channels 49 will be squeezed and will finally burst before exiting the dispensing spout 13. A better-looking and longer-lasting top cream layer is thus obtained.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A beverage making device for preparing a beverage suitable for human consumption with a fine-bubble top cream layer, comprising:
   a beverage unit for supplying the beverage;
   at least one nozzle in fluid communication with the beverage unit;
   a dispensing spout provided with a cavity formed by corresponding interior surfaces of a bottom wall and side walls;
   a central beverage collecting area in a bottom of the cavity of the dispensing spout;
   at least two beverage dispensing apertures in the bottom wall, at opposite sides of the central beverage collecting area, wherein the corresponding interior surfaces of the bottom wall and side walls are further formed to provide a beverage flow path extending from the central beverage collecting area at the bottom of the cavity towards a respective beverage dispensing aperture;
   for each beverage dispensing aperture, a bubble-squeezing member arranged intersecting a straight path between the central beverage collecting area and a respective beverage dispensing aperture in the beverage flow path, with each of the bubble squeezing members extending lengthwise across the bottom wall, starting at, and directly connecting to one side wall of the side walls, extending horizontally straight thereafter towards an opposite side wall of the side walls blocking the straight path and ending the horizontal extension at a distal edge without reaching the opposite side wall, thereby, defining a restricted passage formed by the distal edge of each of the bubble-squeezing members and the opposite side wall, wherein each of the bubble squeezing members diverts the beverage flow along the beverage flow path towards the opposite side wall before a corresponding one of the bubble-squeezing members with the beverage flow path extending between the distal edge of the corresponding one of the bubble-squeezing members and the opposite side wall, the beverage flow path extending from the central beverage collecting area through the restricted passage of the corresponding one of the bubble squeezing members and towards the respective beverage dispensing aperture.

2. The beverage making device according to claim 1, wherein the bubble-squeezing members are each arranged as a horizontally straight rectangular member that extends horizontally straight lengthwise perpendicular to the straight path between the central beverage collecting area and the respective beverage dispensing aperture.

3. The beverage making device according to claim 1, wherein a spacing between the distal edge of the bubble squeezing member and the opposite side wall is configured to burst larger bubbles allowing smaller bubbles to pass when flowing between the bubble squeezing member and the opposite side wall.

4. The beverage making device according to claim 2, wherein the bubble squeezing member comprises at least two horizontally straight rectangular bubble squeezing members defining a horizontally straight channel therebetween that diverts the beverage flow towards the one side wall, with a channel inlet and a channel outlet.

5. The beverage making device according to claim 1, wherein:
an elongated flow guiding member is arranged in the dispensing spout and extends from the bottom wall towards and facing the at least one nozzle; and
the elongated flow guiding member is provided with surface ribs extending along the elongated flow guiding member from a first end thereof, facing the at least one nozzle, towards the bottom wall.

6. The beverage making device according to claim 5, wherein the surface ribs end at the bottom wall.

7. The beverage making device according to claim 5, wherein the at least two beverage dispensing apertures in the bottom wall are arranged at opposite sides of the elongated flow guiding member.

8. The beverage making device according to claim 7, wherein a respective one of the bubble-squeezing members is arranged between each of the at least two beverage dispensing apertures and the elongated flow guiding member to guide the beverage flow from the elongated flow guiding member through the bubble squeezing members and towards the at least two beverage dispensing apertures.

9. The beverage making device according to claim 5, wherein a spacing between the distal edge of the bubble squeezing member and the opposite side wall is configured to burst larger bubbles allowing smaller bubbles to pass the distal edge when flowing between the bubble squeezing member and the opposite side wall.

10. The beverage making device according to claim 5, wherein between each of the at least two beverage dispensing apertures and the elongated flow guiding member or the central beverage collecting area, at least a second bubble squeezing member is arranged, each of the bubble squeezing member and the second bubble squeezing member forming a horizontally straight beverage flow channel therebetween, and wherein the horizontally straight beverage flow channels formed by the bubble squeezing members guide the beverage flow through the horizontally straight beverage flow channels and then between a corresponding bubble squeezing member distal edge and side wall and towards the respective beverage dispensing aperture.

11. The beverage making device according to claim 10, wherein each of the horizontally straight beverage flow channels extends transverse to the straight path.

12. The beverage making device according to claim 10, wherein each of the first and second bubble squeezing members extend horizontally straight lengthwise from the one side wall of the side walls without reaching the opposing side wall of the side walls, with the side walls surrounding the elongated flow guiding member.

13. The beverage making device according to claim 10, wherein each of the first and second bubble squeezing members are horizontally straight rectangular members that are connected to one side wall of the cavity, extend horizontally straight thereafter, and terminate with a respective distal edge facing the respective opposite side wall, a channel inlet or a channel outlet for a passage of the beverage flow being formed between each respective distal edge and the respective interior surface of the opposite side wall.

14. The beverage making device according to claim 5, wherein the elongated flow guiding member has a rounded top end, opposing the at least one nozzle, and a frustum-conical or cylindrical body extending from the rounded top end towards the bottom wall, the surface ribs extending from the center of the rounded top end along the body towards the bottom wall.

15. The beverage making device according to claim 1, wherein the dispensing spout is removable from the beverage making device.

* * * * *